United States Patent [19]

Choffat

[11] 3,751,692

[45] Aug. 7, 1973

[54] TEMPERATURE INSENSITIVE PIEZOELECTRIC RESONATOR MOUNTING

[75] Inventor: Hubert Choffat, Neuchatel, Switzerland

[73] Assignee: Centre Electronique Horloger SA, Neuchatel, Switzerland

[22] Filed: Nov. 4, 1971

[21] Appl. No.: 195,749

[30] Foreign Application Priority Data

Nov. 23, 1970 Switzerland .......... 17321/70

[52] U.S. Cl. .......... 310/9.1

[51] Int. Cl. .......... H04r 17/00

[58] Field of Search .......... 310/8.2, 9.1–9.4

[56] References Cited

UNITED STATES PATENTS

| | | | |
|---|---|---|---|
| 3,581,126 | 5/1971 | Omlin | 310/9.1 |
| 3,566,164 | 2/1971 | Boillat | 310/9.1 |
| 3,054,915 | 9/1962 | Houck | 310/9.1 |
| 2,953,696 | 9/1960 | Ruggles | 310/9.1 |
| 2,965,773 | 12/1960 | Hill, Jr. | 310/9.1 X |

*Primary Examiner*—J. D. Miller
*Assistant Examiner*—Mark O. Budd
*Attorney*—Richard K. Stevens, Robert J. Frank et al.

[57] ABSTRACT

A bar of $x$–$y$ oscillating quartz is suspended in a casing under vacuum by two pairs of suspension wires fixed on opposite faces of the bar, centrally facing ends of each pair of wires being fixed to a respective bar section each secured to a single respective support filament passing through a central insulating part of the casing base. Final adjustment of the frequency is effected by the deposit of material onto the ends of the quartz bar after mounting same, but prior to encapsulation and evacuation.

4 Claims, 1 Drawing Figure

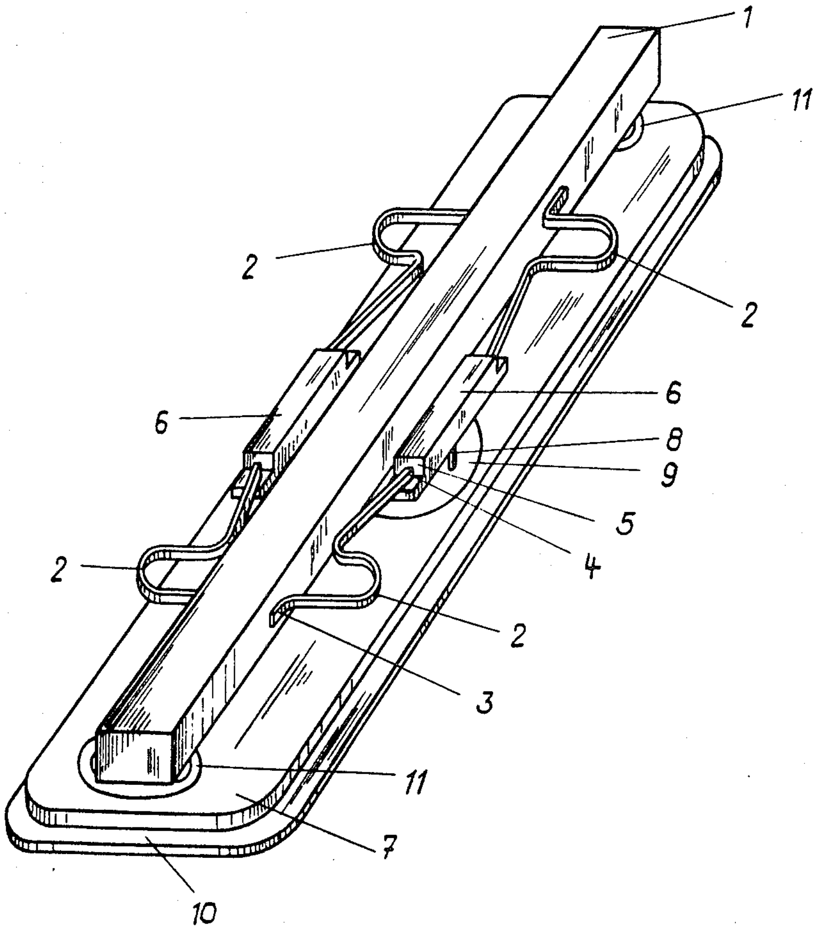
1
11
2
2
6
6
8
9
5
4
2
2
3
11
7
10

TEMPERATURE INSENSITIVE PIEZOELECTRIC RESONATOR MOUNTING

This invention relates to piezoelectric resonators and to processes for manufacturing same.

It is already known to provide a piezoelectric resonator by suspending a bar of quartz to oscillate in the *x–y* mode by means of four suspension wires, two of these wires being fixed to one face of the bar and the other two being fixed to an opposite face of the bar, the four wires being secured to four corresponding support filaments passing through the base of a casing encapsulating the resonator under vacuum.

One of the drawbacks of such an assembly is that, upon encapsulation of the casing and upon evacuation and stoving, the assembly formed by the casing (base and cover) and the quartz bar and its suspension undergoes various deformations, due to three different effects, namely:

a. Variations of the temperature causing variation of the dimensions of the casing. Since the support filaments are fixed to the base of the casing, these changes of dimension cause stresses in the quartz bar and its suspension. The material of the casing thus influences the inversion point ($T_o$) of the resonator and the stresses produced modify the natural frequeny of the quartz bar.

b. Thermal treatments after the final adjustment of the frequency; for example, stoving, soldering or welding and so on. These treatments cause modification of the adjusted frequency.

c. Mechanical treatments or handling after the final adjustment of the frequency; for example, evacuation, closing, manufacturing operations, fitting the resonator, impacts deforming the casing, and so on, which also cause modification of the adjusted frequency.

Effects (b) and (c) dictate that the final adjustment of the frequency should be carried out at the last possible moment, for example after sealing the casing by cold soldering or cold welding, which complicates and renders extremely delicate the manufacture of the resonator.

The invention aims to eliminate, at least partially, or to palliate the above mentioned drawbacks.

A piezoelectric resonator according to the invention comprises an elongated bar of piezoelectric material suspended in a casing under vacuum to oscillate in the *x–y* mode, a first pair of suspension wires fixed on one longitudinal face of said bar, and a second pair of suspension wires symmetrically fixed on an opposite longitudinal face of said bar, said first and second pairs of wires each being connected to a single respective support filament passing through a base of said casing.

Since the resonating bar of the resonator according to the invention is only supported by one filament per side, a variation in the length of the encapsulating casing does not effect the resonator suspension and consequently does not generate longitudinal stresses in the bar.

The invention also concerns a process for manufacturing a piezoelectric resonator comprising the steps of providing a base with two support filaments passing therethrough, suspending an elongated bar of piezoelectric material to oscillate in the *x–y* mode by securing a first pair of suspension wires fixed on one longitudinal face of said bar and a second pair of suspension wires symmetrically fixed on an opposite longitudinal face of said bar respectively to said two support filaments, adjusting the frequency by the deposit of material at ends of said bar, mounting a cover on said base to provide a casing, and evacuating and sealing said casing.

The single FIGURE of the accompanying drawing is a perspective view of an embodiment, given by way of example, of a resonator according to the invention, shown with the cover removed.

The resonator shown comprises a bar 1 of quartz cut to oscillate in the *x–y* mode and supported by four suspension wires 2. Pairs of these four wires 2 are fixed by their curved ends 3 onto two opposite longitudinal faces of the bar 1. The other facing ends 4 of the wires 2 are fixed in notches 5 at the two ends of two metallic bar sections 6, each suspension wire 2 having adjacent its fixed end 3 an outwardly bulging loop to accommodate for vibration of the bar 1. Each of the bar sections 6 is itself fixed to the base 7 of the casing by means of a filament 8, only one of which is visible, passing through a common electrically insulating support plate 9 in the base.

The two filaments 8 can be formed by two pins of a transistor base plate with high reliability centrally fixed in the base 7.

The base 7 has a flange 10 adapted to be assembled with and soldered or welded to the cover, not shown, of the casing.

The resonator also comprises two tubes 11 soldered or welded in the base 7, and whose purpose is to enable a final cleaning operation and to evacuate the casing when assembled.

The resonator is preferably made according to the following procedure. Firstly, the cleaning and evacuating tubes 11 and the support plate 9, already provided with two traversing filaments 8, are placed in and soldered or welded to the base 7. The bar sections 6 are then soldered or welded to the filaments 8. The quartz bar 1 provided with its four suspension wires 2 is then secured by soldering or welding the free facing ends 4 of the wires 2 to the ends of the bar sections 6.

Once this mounting operation is completed, the frequency is roughly adjusted by filing the ends of the quartz bar 1. Final adjustment of the frequency is then carried out by the deposit of material on the cover or upper side of the ends of the quartz bar. Finally, the cover is soldered or welded onto the base 7, final cleaning is carried out by means of the evacuation tubes 11, the casing is evacuated by stoving, and the tubes 11 are sealed by cold soldering.

The order of carrying out certain of these operations may be inverted, as convenient.

The described resonator and process for manufacturing same have the following advantages:

They simplify the manufacturing operations, notably by elimination of the final frequency adjustment after closing and sealing the casing, which adjustment is particularly delicate.

They enable a substantial reduction of the number of solder or weld joints which must withstand the vacuum, and enable an increased final stoving temperature to be employed.

The "carrier" function is no longer directly performed by the casing, whose role is reduced to one of fluidtight encapsulation, but by the two bar sections. Consequently, the number of requirements that each material must meet is reduced, the sensitivity of the frequency to deformation of the casing is reduced and, inter alia, there is a greater possibility of choice of the inversion temperature for a given bar.

The mounting with two centraly located support filaments and two bar sections consideraby diminshes the effects of temperature variations and the effects due to thermal treatments, which simplifies the manufacturing operations and makes the resonator of simpler construction.

A diminution of the effect due to temperature variations implies less strict requirements for the thermal properties of the encapsulation elements.

A diminution of the effect due to thermal treatments means less strict requirements for the thermal stability of the encapsulation elements, notably the quality of the material, and stamping of the pieces.

A diminution of the effect due to mechanical treatments leads to a lesser required rigidity for the assembly, a more convenient use of cold-welding, and less strict assembly operations.

The proposed suspension mechanically decouples the quartz bar from the casing for two reasons:

1. The relatively close positioning of the filaments linking the casing to the suspension reduces the stress transmitted to the quartz bar for a given deformation of the casing.

2. Central support of the bar sections enables the effect of an angular deformation of the anchoring points of the support filaments in the casing to be reduced.

Whilst the use of only two support filaments and two corresponding bar sections reduces the effects mentioned in the introduction, it however leads to similar effects in the bar sections, and the following points should be borne in mind:

d. The thermal properties of the material of the bar sections influences the inversion point of the resonator. This effect can possibly be used to advantage, for example, for the modification of the inversion point $T_0$ by choice of the bar section, or even for influencing quadratic thermal coefficient of the resonator.

e. The problem of the effect of thermal treatments on the mechanical stability of the bar section remains open. However, this problem is simpler to solve because of the relatively simple shape of the element in question.

f. The effect of mechanical stresses on the bar section is minimal in view of the aalmost complete absence of stresses in this element.

g. Since the casing no longer plays a part in the suspension strictly speaking, the reaction of the support upon mounting the resonator is practically nil.

The described bar section which forms an element separating the suspension wires can be integrated into these latter or even totally eliminated, by using longer suspension wires. The advantages of such a system are the same as those mentioned above but, in view of the necessary dimensions for the suspension wires, the provision of the latter would in most cases prove to be more critical.

What is claimed is:

1. A piezoelectric resonator comprising a casing having a base member; an elongated bar of piezoelectric material suspended in said casing and extending parallel to said base member, said resonator being under vacuum to oscillate in the *x–y* mode; a first pair of suspension wires fixed on one longitudinal face of said bar, and a second pair of suspension wires symmetrically fixed on an opposite longitudinal face of said bar, said first and second pairs of wires each being connected to the same point on a single respective support filament passing through the base of said casing; said support filaments preventing generation of longitudinal stresses in said bar despite variations in the length of said casing.

2. A resonator according to claim 1, in which the two support filaments pass through a common electrically insulating support member located centrally in said base.

3. A resonator according to claim 1, in which each of said pairs of suspension wires are connected by a bar section secured to the respective support filament.

4. A resonator according to claim 1, in which said support filaments are formed by two pins of a transistor base plate centrally fixed in said base.

* * * * *